United States Patent
Yu

(10) Patent No.: US 8,877,141 B2
(45) Date of Patent: Nov. 4, 2014

(54) SYSTEM FOR PREPARING ARRAYS OF BIOMOLECULES

(75) Inventor: Xiang Yu, Germantown, MD (US)

(73) Assignee: QIAGEN Sciences LLC, Germantown, MD (US)

(*) Notice: Subject to any disclaimer, the term of this patent is extended or adjusted under 35 U.S.C. 154(b) by 647 days.

(21) Appl. No.: 12/205,605

(22) Filed: Sep. 5, 2008

(65) Prior Publication Data

US 2009/0069200 A1 Mar. 12, 2009

Related U.S. Application Data

(60) Provisional application No. 60/970,295, filed on Sep. 6, 2007.

(51) Int. Cl.
*G01N 21/75* (2006.01)
*B01L 3/00* (2006.01)

(52) U.S. Cl.
CPC ...... *B01L 3/5085* (2013.01); *B01J 2219/00315* (2013.01); *B01J 2219/00466* (2013.01); *B01J 2219/005* (2013.01); *B01J 2219/00662* (2013.01); *B01L 3/5025* (2013.01); *B01L 2200/0642* (2013.01); *B01L 2300/0829* (2013.01)
USPC ...................................................... 422/407

(58) Field of Classification Search
CPC ............. B01J 2219/00315; B01J 2219/00317; A61K 45/06; G01N 21/75; G01N 31/22; G01N 33/52; B01L 3/5085; B01L 2300/0829
USPC ...................................................... 422/407
See application file for complete search history.

(56) References Cited

U.S. PATENT DOCUMENTS

| | | | | |
|---|---|---|---|---|
| 4,681,742 A * | 7/1987 | Johnson et al. | ............... | 422/552 |
| 4,948,564 A * | 8/1990 | Root et al. | ................... | 422/534 |
| 5,529,756 A * | 6/1996 | Brennan | ...................... | 422/131 |
| 5,650,323 A * | 7/1997 | Root | ......................... | 435/284.1 |
| 5,925,732 A * | 7/1999 | Ecker et al. | ...................... | 506/40 |
| 6,063,282 A * | 5/2000 | Moulton | ....................... | 210/650 |
| 6,429,027 B1 * | 8/2002 | Chee et al. | .................... | 436/518 |
| 6,485,690 B1 * | 11/2002 | Pfost et al. | .................... | 422/552 |
| 7,390,463 B2 * | 6/2008 | He et al. | ........................ | 422/504 |
| 7,534,396 B2 * | 5/2009 | Knebel et al. | .................... | 422/553 |
| 2003/0104494 A1 * | 6/2003 | Ravkin et al. | .................. | 435/7.9 |
| 2006/0051809 A1 | 3/2006 | Nazarenko et al. | | |
| 2008/0124806 A1 * | 5/2008 | Noda et al. | ...................... | 436/56 |

OTHER PUBLICATIONS

Roda et al. (2002) "Microtiter Format for Simultaneous Multianalyte Detection and Development of a PCR-Chemiluminescent Enzyme Immunoassay for Typing Human Papillomavirus DNA's," *Clin Chem.* 48(10):1654-1660.
American National Standards Institute, Society for Biomolecular Sciences, ANSI/SBS Jan. 2004, "Footprint Dimensions for Microplates," Jan. 25, 2006, 8 pages.

(Continued)

*Primary Examiner* — Lore Jarrett
(74) *Attorney, Agent, or Firm* — Seed IP Law Group PLLC

(57) ABSTRACT

Provided are systems for arrays for assaying various biomolecules and other compounds in a microtiter plate format. The wells are designed so as to contain subwells to facilitate fluid communication between subwells and to allow for efficient human or robotic manipulation of samples and assay of binding or other interactions of components within the wells.

22 Claims, 3 Drawing Sheets

(56) References Cited

OTHER PUBLICATIONS

American National Standards Institute, Society for Biomolecular Sciences, ANSI/SBS Feb. 2004, "Height Dimensions for Microplates," Jan. 26, 2006, 9 pages.

American National Standards Institute, Society for Biomolecular Sciences, ANSI/SBS Mar. 2004, "Bottom Outside Flange Dimensions for Microplates," Jan. 26, 2006, 10 pages.

American National Standards Institute, Society for Biomolecular Sciences, ANSI/SBS Apr. 2004, "Well Positions for Microplates," Jan. 27, 2006, 13 pages.

* cited by examiner

SYSTEM FOR PREPARING ARRAYS OF BIOMOLECULES

CROSS REFERENCE TO RELATED APPLICATIONS

This application claims the benefit of U.S. Provisional Application No. 60/970,295, filed Sep. 6, 2007, which application is incorporated by reference in its entirety to the extent there is no inconsistency with the present disclosure.

ACKNOWLEDGEMENT OF FEDERAL RESEARCH FUNDING

Not applicable.

BACKGROUND OF THE INVENTION

The detection of specific binding between biomolecules, such as antigens, antibodies, the complementary strands of nucleic acid, and ligands and receptors is a key experimental assay in biological research. Given the complexity of biological systems, there is a need for assays that assess the binding of many different potential binding pairs. Assays that provide for rapid, parallel, compact, and inexpensive testing for binding between macromolecules are desired and accelerate discovery of new therapeutic drugs.

High throughput automation has been developed for biomedical and pharmaceutical research. In this area, instruments are designed to handle microtiter plates. These plates conform to standards developed by the Society for Biomolecular Screening and were published in conjunction with the American National Standards Institute (SBS Standards), which are conformed to by most, if not all, manufacturers of microtiter plates. Wells in these plates are designed with standard spacing, for example, a 96-well plate has twelve columns and eight rows with 9 mm spacing between the centers of adjacent wells. A 384-well plate has twenty-four columns and sixteen rows with 4.5 mm spacing between the centers of adjacent wells. A 1536-well plate has forty-eight columns and thirty-two rows with 2.25 mm spacing between the centers of adjacent wells. Pipetting and plate-washing robotic instruments have been designed to handle plates conforming to this standard. Optical instrumentation has also been designed around the SBS microtiter plate standards.

Arrays are commonly used to process assays based on specific binding of biological molecules, e.g., antibodies to antigens or the complementary strands of nucleic acid to each other or ligands to receptors. One simple mode of using arrays typically entails coating the bottom surface of each well of an array with a molecule, (e.g., an antibody) to provide an immobilized molecule and then adding different fluid samples which may or may not contain a molecule that binds to the immobilized molecule (e.g., an antigen specifically bound by the antibody) to each well. After allowing for binding, the fluid sample is removed, and the well is washed to remove unbound material. Binding or lack of binding is then detected using well established methods. Alternatively, different samples may be used to coat different wells, and a common fluid sample may then be added to all the wells, followed by detection of binding. Each well in either mode is used to produce a single data point related to the binding of, for instance, an antibody to an antigen. Use of microtiter plates having, for instance, 1536 wells allow many assays to be done in parallel, but owing to the small size of each well and the complexity of the liquid handling required, it is difficult for these assays to be performed reliably by hand, and robotic systems are almost always used.

Arrays comprised of such biomolecules as DNA, oligonucleotides, oligopeptides, polypeptides and proteins have become standard tools for monitoring changes in gene expression, and for detecting and measuring specific binding between biomolecules or between biomolecules and other compounds. This technique has found rapidly growing use in many molecular biology, biochemistry, immunology, pharmacology and functional genomics or proteomics laboratories. In array based assays hundreds to tens of thousands of probes are attached to a substrate in an array format, and sample solutions are incubated on these arrays. Many samples are often tested for binding to many different biomolecules which have been immobilized to sites within the array. These assays require efficient processing of samples and analysis of results. Automation, particularly robotic automation, of these processes is particularly valuable.

A system that allows multiple fluid samples to be tested for binding to multiple immobilized materials which would be amenable to manual handling while being compact and easy to manufacture is desired. A system that also facilitates the use of robotic systems when available and appropriate is also desired. One approach widely used to assemble multiple sites of immobilized molecules involves spotting of small volumes on a flat surface such as glass to produce small regions of bound molecules. This spotting process requires precise targeting during the spotting process and the volume that can be spotted in a defined area is limited.

Currently, DNA or protein microarrays are commonly made using glass microscope slides. In a typical process, a robotic "spotter" is used to deposit small amounts of fluids containing the probes onto a glass slide to form an array. Approximately tens of thousands of spots can be arrayed onto a standard glass slide. The DNA or protein is maintained at its site of application solely by its binding to the surface, and the spatial definition and location of the binding is dependent on the precision of the spotting process. No physical barrier such as a wall is used to define the boundary of the spot or its location. Next, a solution of labeled targets is applied on the slide, typically by hand. After the slide is then placed in an incubator/mixer for a time effective for binding to occur, often hours. The fluorescent signals from the bound targets are then imaged using a laser and a photomultiplier tube (e.g. a laser scanner). This method, however, suffers from low throughput, poor data quality and poor reproducibility.

An alternative to using glass slides would be to use existing molded polymer microtiter plates, where arrays are printed on the bottom of the wells. The microtiter plate is a well-known tool; the attachment of biomolecules or other molecules within the microwell either as single elements (e.g., ELISA plates) or in the form of arrays for example those described in International Application publication number WO 98/29736, which is hereby incorporated by reference, is also well known. The reading of arrays, however, is difficult in conventional microwells without the use of expensive equipment. There are also limitations in terms of field of focus and uniform lighting of the bottom of the well using conventional microtiter plates. In addition, the non-symmetrical design of these plates (solid bottom with open topped wells) results in molded parts that warp due to differential thermal expansion. In recent years, methodologies have been developed to print multiple spots onto the bottoms of the microtiter plates (e.g. glass bottom plates) using pin type arrayers. Special imaging instruments are also now available to image this type of in-well microarray. Means to construct arrays on such a scale that do not require high precision and which permit more forgiving manufacturing tolerances than are required to make the above arrays would be desirable. Arrays that allow for use of a larger volume of solution per locus constructed than is feasible with the above spotting methods would be desirable. Arrays of this scale are commonly called microarrays.

In a typical microtiter plate the surface area available for analyte binding for practical purposes is limited to the bottom surface plus the side walls up to at most halfway to the top of the well. A system that maximizes the surface area to which the immobilized binding partner is bound while allowing for effective washing of unbound material in the fluid sample without increasing the overall scale of the system is also desired.

Traditionally, arrays are processed by washing them with a single sample at a time, e.g., serum taken from a single patient. With the further extension of arraying technology, it would be desirable to study the interaction of many different samples with a given array of materials. For example, one may want to screen thousands of different serum samples from patients with an array of 96 different antigens. Alternatively, one may wish to screen thousands of different small organic compounds for their ability to disrupt or prevent protein-protein interactions in an array of 96 different pairs of proteins. To do this, it would be valuable to use the current instrumentation for preparing and scanning arrays in combination with the current instrumentation for processing samples in microtiter plates.

Given the wide acceptance of liquid handling robotics designed to use microtiter plates that conform to an SBS Standard, there is a need in the art for a high-throughput system that allows arrays which conform to an SBS Standard microtiter plate to be processed using robotics, and for such a system that produces high quality data.

SUMMARY OF THE INVENTION

The invention provides novel processes and devices for configuring smaller arrays within larger arrays in microtiter plates. The processes and devices described herein may be adapted for use with arrays that are arranged on substrates made from a variety of materials. There are no limitations on the number of individual subwells in any array described herein, or on the shape and dimensions of the subwell. Circular subwell patterns and subwells arranged in a rectangular grid pattern are preferred. Furthermore, the processes and devices described herein may be adapted for use with any type of microtiter plate without limitation to the size, shape, and features of the plate; the size, shape, and number of wells; or to the materials and methods used to prepare the plate. This invention relates to devices and apparatus for constructing and using arrays of biomolecules, and in particular, an array of subwells within a microtiter plate well configured for an SBS Standard microtiter plate and for use with automated processing systems designed for such standard plates. While current commercial conditions make adoption of this standard desirable, the invention may be configured using other geometries, well arrangements, and dimensions. The invention is applicable to DNA diagnostics, mutation screening, gene expression monitoring, protein analysis, cell-based assays and other applications which employ a robotics workstation.

Accordingly, the present invention is directed to an array based assay method and apparatus that substantially obviates one or more of the problems, limitations, and disadvantages of the currently available methods and apparatus.

One embodiment of the present invention relates to a microtiter plate comprising an array of wells, an array of subwells within each of well of the array of wells, a reservoir beneath each array of subwells in fluid communication with all the subwells, and a port in fluid communication with the reservoir beneath each array of subwells. This embodiment may further comprise a lid for the array of wells, wherein the lid contains holes above each subwell and above each port. The well and subwell spacing and dimensions may conform to the SBS standard. The microtiter plate may comprise one or more of polystyrene, polypropylene, high-density polypropylene, low-density polypropylene, a cycloalkene or polycarbonate. In a preferred embodiment the microtiter plate comprises polystyrene.

Another embodiment of the present invention relates to a microtiter plate comprising an array of wells, wherein each well comprises an array of subwells, and wherein the cross-sectional area of the top of each subwell is greater than the cross-sectional area of the bottom of each subwell; a reservoir beneath each array of subwells in fluid communication with the subwells in the array of subwells; and a port within each well, the port being in fluid communication with the reservoir beneath each array of subwells. The tapered shape of the subwell is desirably such that a bead may be retained in the subwell. This embodiment may further comprise a lid for the array of subwells, and the lid may contain openings above each subwell and above each port. The subwells of this embodiment may contain a bead positioned between the top of each subwell and the bottom of each subwell. The spacings and dimensions in the array of wells and the array of subwells in this embodiment may conform to an SBS standard. The microtiter plate of this embodiment may comprise at least one material selected from the group consisting of polystyrene, polypropylene, high-density polypropylene, low-density polypropylene, a cycloalkene or polycarbonate. In a preferred embodiment, the microtiter plate comprises polystyrene. The beads of this embodiment may comprise materials selected from the group consisting of at least one of nylon, polystyrene, stainless steel, glass, agarose, a cellulosic material, or ceramic. The beads of this embodiment may be substantially spherical and have diameters between 0.8 mm and 1.7 mm. The beads of this embodiment may comprise a reagent or reagents for measuring an analyte of interest. The beads of this embodiment may further be positionally indexed within each well.

A further embodiment of the present invention relates to a microtiter plate comprising an array of wells; an array of subwells within each well; a reservoir beneath the array of subwells, wherein the reservoir is in fluid communication with the array of subwells within a well; a port in fluid communication with the reservoir beneath each array of subwells; and a porous separator positioned between the array of subwells and the reservoir beneath each array of subwells. This embodiment may further comprise a lid for the array of subwells. The lid of this embodiment may contain openings above each subwell and above each port. The subwells of this embodiment may contain one or more beads. The well and subwell spacing and dimensions of this embodiment may conform to an SBS standard. The microtiter plate of this embodiment may comprise one or more of polystyrene, polypropylene, high-density polypropylene, low-density polypropylene, a cycloalkene or polycarbonate. In a preferred embodiment the microtiter plate comprises polystyrene. The beads of this embodiment may comprise a material selected from the group consisting of at least one of nylon, polystyrene, stainless steel, glass, agarose, a cellulosic material or ceramic. The beads of this embodiment may be substantially spherical and have diameters between 0.01 mm and 0.07 mm. Advantageously, the diameter of the beads is greater than the pore size of the porous separator such that the beads are retained within the subwell. The beads of this embodiment may also comprise a reagent or reagents for measuring an analyte of interest. The beads of this embodiment may be positionally indexed within each well.

DETAILED DESCRIPTION OF THE INVENTION

Figure 1:
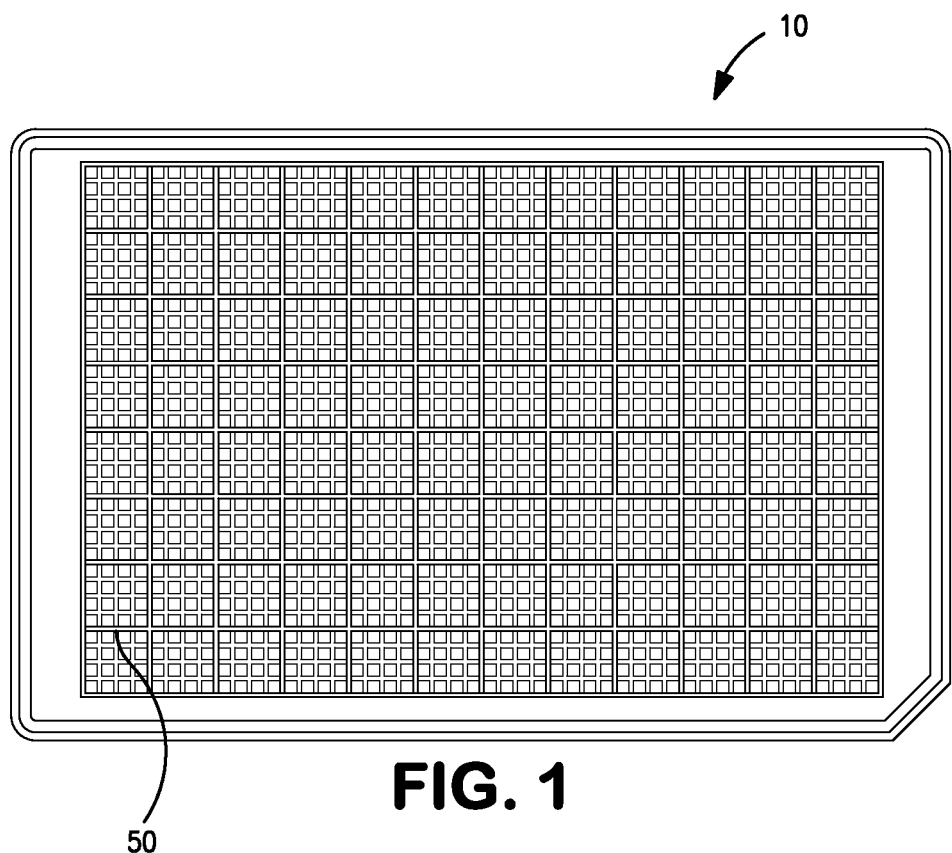
FIG. 1 shows a bottom view of a microtiter plate which conforms to an SBS standard for a 1536 well plate. The well walls have been modified to create an array of subwells in each main well.

The following definitions are provided to assist the reader in understanding the invention disclosed herein, but they are not intended to limit the scope of the claims.

"Array": The term "array", as used herein, refers to a collection of subwells located on a planar surface, preferably a flat surface, more preferably in a rectangular pattern of columns and rows. As referred to herein each subwell in an array may contain a different biomolecule, though in some cases it may be desirable for multiple subwells in an array to contain the same biomolecule. Similarly, the array may contain analyte beads capable of measuring one or more analytes of interest, with the positional indexing relating to the particular analytes measured or detected.

"Microtiter plate": The term "microtiter plate", as used herein, refers to any assembly of wells wherein the wells are laid out in a horizontal grid, most commonly the grid will consist of a rectangular array with 8 wells in one dimension and 12 wells in the other with a spacing of 9 millimeters. The dimensions and geometry of the well array are not limited to microtiter plates containing 96 wells or any multiple or fraction thereof and the wells need not be arranged in a rectangle. Microtiter plates having dimensions of an SBS Standard are preferred, but microtiter plates with other dimensions fall within the definition of microtiter plates as used herein. The microtiter plate may comprise a plate frame and wells which may be reversibly or irreversibly attached to the plate frame. The microtiter plate may comprise a lid, which may have one or more ports and/or one or more openings or vents aligned with wells, subwells, and/or fluid ports.

"Biomolecule": The term "biomolecule", as used herein, refers to molecules related to living organisms, including, but not limited to, enzymes, receptors, nucleoproteins, neurotransmitters, hormones, cytokines, cell response modifiers such as growth factors and chemotactic factors, antibodies, vaccines, haptens, toxins, interferons, ribozymes, anti-sense agents, plasmids, DNA, and RNA. Other biomolecules may include pharmaceuticals and other chemical compounds such as lipids, phospholipids, glycolipids, sterols, vitamins, lectins, carbohydrates, sugars, disaccharides, amino acids, nucleotides, phosphates, monosaccharides, peptides, oligopeptides, neurotransmitters, polypeptides, proteins, nucleic acids, oligosaccharides, polysaccharides, secondary metabolites and lignins.

"Bead": The term "bead", as used herein, refers to any particle to which a reagent may be attached. A bead may be made of any suitable material, and may be of any size or shape. A bead preferably is essentially spherical in shape and when used in a particular application is of substantially uniform size and shape. Suitable bead materials include nylon, polystyrene, stainless steel, glass, agarose, a cellulosic material or ceramic. Preferably a bead is solid, made of a plastic such as polystyrene, and has a density equal or greater than that of water. The surface of a bead may be smooth or rough, a rough surface being preferred when surface binding area is most desirably maximized. The surface of a bead may be treated to facilitate binding of a biological molecule or treated to minimize non-specific binding.

"Well": The term "well", as used herein, refers to any physically defined space (defined by at least one wall and a bottom) in which a fluid can be contained. The bottom of a well may be any shape: flat, concave, or tapered to a point. The horizontal cross-section of a well may be circular or rectangular or any other shape. Moreover, its cross-sectional area may be constant or changing, and particularly may change to provide a tapered shape to facilitate fluid flow and/or to retain a bead within the subwell. A well may optionally have a hole in its bottom to allow fluid to flow into and out of the well. Alternatively, at least one wall and/or the bottom may be porous to allow fluid communication between wells or with the reservoir or plate frame outside the well. The bottom of a well may be substantially flat and may be transparent to electromagnetic radiation such as x-rays, ultraviolet light, visible light, infrared light and microwave electromagnetic radiation.

"Subwell": The term "subwell", as used herein, refers to a well that is contained within a well. As with any well as defined herein it may have any shape or dimensions. The walls separating adjacent subwells generally are lower than the walls separating adjacent wells, thereby allowing a single filling of fluid into a well to flood all subwells in the well without significant risk of cross flow to an adjacent well, i.e., to allow fluid communication between subwells. A subwell may have a porous separator such that it allows fluid to pass through, or no bottom (i.e., may be open to a reservoir below). The walls between the subwells may be transparent or non-transparent, with non-transparent walls being preferred when optical isolation of individual wells is desired. Arrays of subwells may be fabricated independent of microtiter plates into which they may be installed to make a complete assembly. An array of subwells may be designed to be reversibly inserted into a plate frame to form an array of wells and to allow manual or robotic insertion and/or removal of fluids. Moreover, each subwell may be coated with biological or other molecules or loaded with one or more beads prior to their installation into a microtiter plate.

"Porous Separator": The term "porous separator", as used herein, refers to an element located between a subwell or subwell array and a reservoir which allows fluid communication between the subwell or subwell array and the reservoir. A porous separator may be designed with a pore size adapted to prevent beads held in the well or subwell from falling through to the reservoir or migrating to another well or subwell. If beads or other materials are to be retained within the subwell, the openings in the porous separator must be smaller than the diameter of the beads or other materials to be retained or contained in the subwell. Preferably the openings in the porous separator are not circular if the beads used are spherical in order to minimize or prevent clogging. The porous separator may be constructed of any material such as a plastic or mixture of plastics, metal or mixture of metals, and a ceramic. Further, a porous separator may be constructed of a combination of any of the above mentioned materials.

"Reservoir": The term "reservoir", as used herein, refers to a compartment for containing fluid located beneath an array of subwells in fluid communication with each other. A reservoir enables introduction of fluid reagents containing biological molecules or wash solutions to each subwell in a subwell array. Further, a reservoir allows for removal of reagents containing biological molecules or wash solutions from each subwell in a subwell array. A reservoir is accessed through a port which can accommodate a liquid handling dispenser tip. In a preferred embodiment, the liquid handling dispenser tip can access the bottom of the reservoir. The liquid handling dispenser can both provide fluids to the reservoir and remove fluids from the reservoir.

"Port": The term "port", as used herein, refers to an opening in a microtiter plate which allows a liquid handling dispenser tip access to a reservoir. A subwell with no bottom may be used as a port. Further, a port may be provided in any portion of a subwell array, well, or microtiter plate. In a preferred embodiment of the invention, a port is provided in each subwell array to allow liquid handling dispenser tip access to the reservoir.

"SBS Standard": The term "SBS standard", as used herein, refers to the standard for footprint, height, bottom outside flange, and well positions published in 2004 by the American National Standards Institute as publications ANSI/SBS 1-2004, ANSI/SBS 2-2004, ANSI/SBS 3-2004 and ANSI/SBS 4-2004 which are hereby incorporated by reference.

The horizontal cross-section of a subwell may be circular or rectangular or any other shape; moreover, its cross-sectional area may be constant or changing. In an embodiment, the horizontal cross-sectional area may change to provide a tapered shape to facilitate fluid flow and hold a bead or other particle between the top and bottom of a subwell. Advantageously, fluid flow is possible when one or more beads are retained within a subwell.

Subwells may be configured to contain beads which may be coated with one or more biological (or other) molecules, which may be suspended above and retained by a porous separator that prevents the beads from escaping through the bottom of the subwell but which allows efficient fluid flow through the mesh to provide for introduction of fluid reagents containing biological molecules and for flow of wash solutions to remove unbound material. When used to contain coated beads, the surfaces of the subwell wall may or may not be coated.

The present invention provides an improved array assay method including providing a microtiter plate having a first set of wells, wherein each well contains a set of subwells, each of which optionally contains one or more immobilized molecules. The fill capacity, that is the maximum volume that can be held in a well (or subwell) without significant risk of overflow, may be in the range of 5 to 15 microliters when the dimensions of each subwell allow for 16 to 36 subwells per well where the well conforms to the dimensions of a well in a SBS Standard 96 well plate. The practical fill capacity of such a well in a standard 96 well microtiter plate is a few hundred microliters. For subwells contained within wells larger or smaller than those of an SBS Standard 96 well microtiter plate, the volumes of the subwells and wells are accordingly larger or smaller. If a well is filled to near its fill capacity by a single solution, that single solution has access to every subwell in the well. In this way, using small volumes (several microliters), each subwell can be coated with different materials while when using larger volumes (a few hundred microliters), all the subwells in the well can be contacted with a single solution, for example, a reagent solution.

One or more subwells in an array within a well may be specifically designed to give access to a reservoir. Such a specially designed subwell is not used to provide an assay result but rather is provided as a port for introducing or removing fluid into or from the well, for example, by pipette or aspiration.

Various configurations of wells, subwells, beads, and objects inserted into subwells herein described, including by the examples herein, are most generally employed using only one configuration throughout a single microtiter plate. However, circumstances and applications may arise wherein different configurations may advantageously be employed in a single microtiter plate. Additional features and advantages of the invention are set forth in the descriptions that follow and will be apparent from the description, or may be demonstrated by the examples of the invention. The objectives and other advantages of the invention will be realized and attained by the structure particularly pointed out in the written description and claims hereof as well as in the appended drawings.

It is understood that both the foregoing general description and the following examples are exemplary and are intended to provide further explanation of the invention without limitation to the invention as claimed.

EXAMPLE 1

Single Analyte Bead Per Subwell

Figure 2:
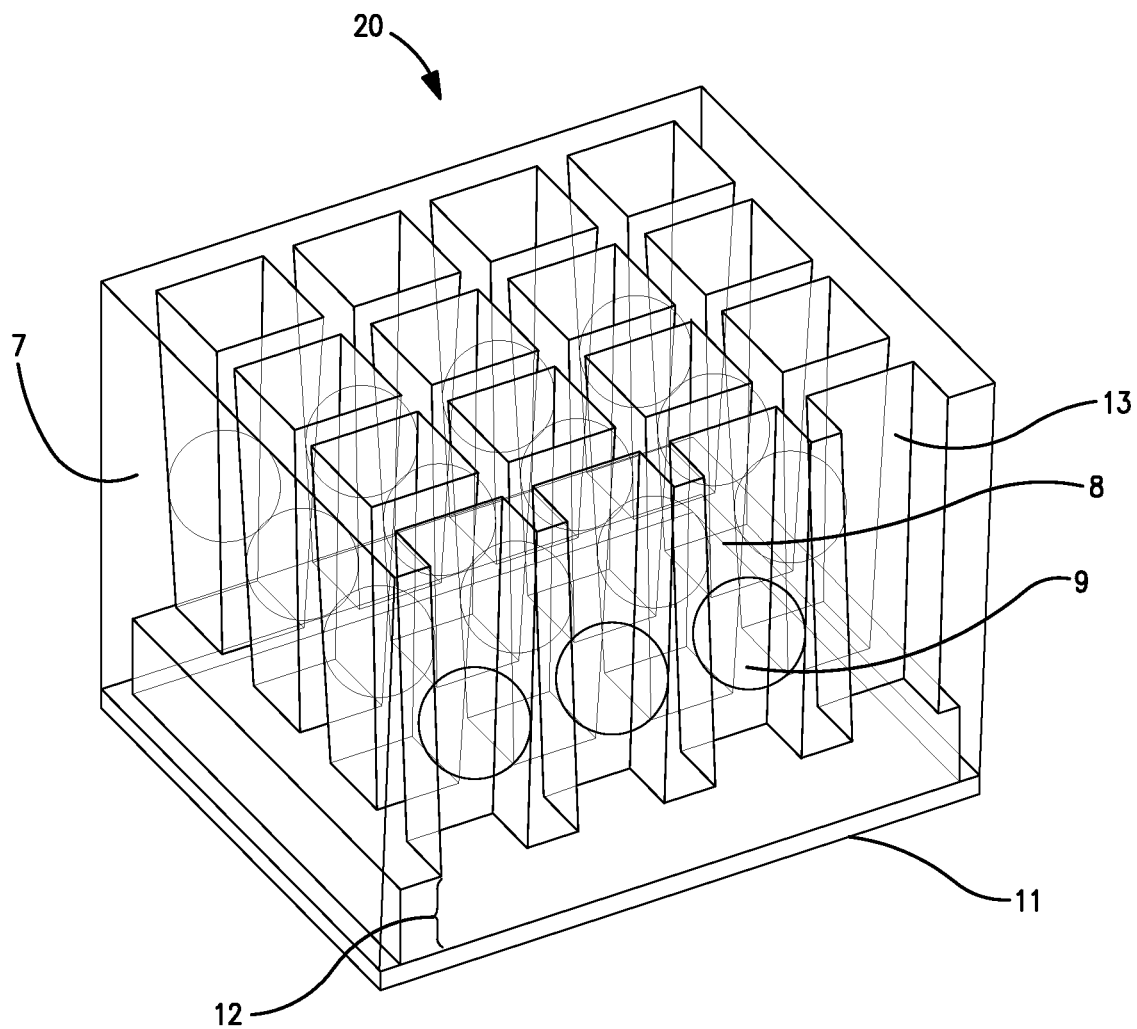
FIG. 2 shows a perspective view of an array of subwells within a single main well. This embodiment of the present invention comprises a single analyte bead in each subwell in the subwell array.

A microtiter plate 10 which, such as that shown in FIG. 1, is produced such that the walls defining each well 50 have been adapted to form arrays of subwells within each well. A subwell array 20 may be adapted as shown in FIG. 2 such that the horizontal cross-sectional area of each subwell 8 is larger at the top of each subwell 8 than at the bottom of each subwell 8, advantageously without preventing or impeding fluid flow. This allows a spherical analyte bead 9 having an equatorial cross-sectional area between that of the horizontal cross-sectional area of the top and bottom of each subwell 8 to lodge between the top and bottom of each subwell 8. The force required to dislodge the bead 9 is preferably large enough such that the bead 9 will not dislodge under normal shipping and handling conditions. The bead 9 diameter is preferably between 0.8 mm and 1.7 mm and the well 7 and subwell 8 dimensions and spacings conform to the SBS standard. The subwell plate 7 contains a reservoir 12 beneath the subwell array 20 which is in fluid contact with each subwell 8. The reservoir 12 is partially defined by a plate bottom 11 which also defines the bottom of the well plate 7.

Figure 3:
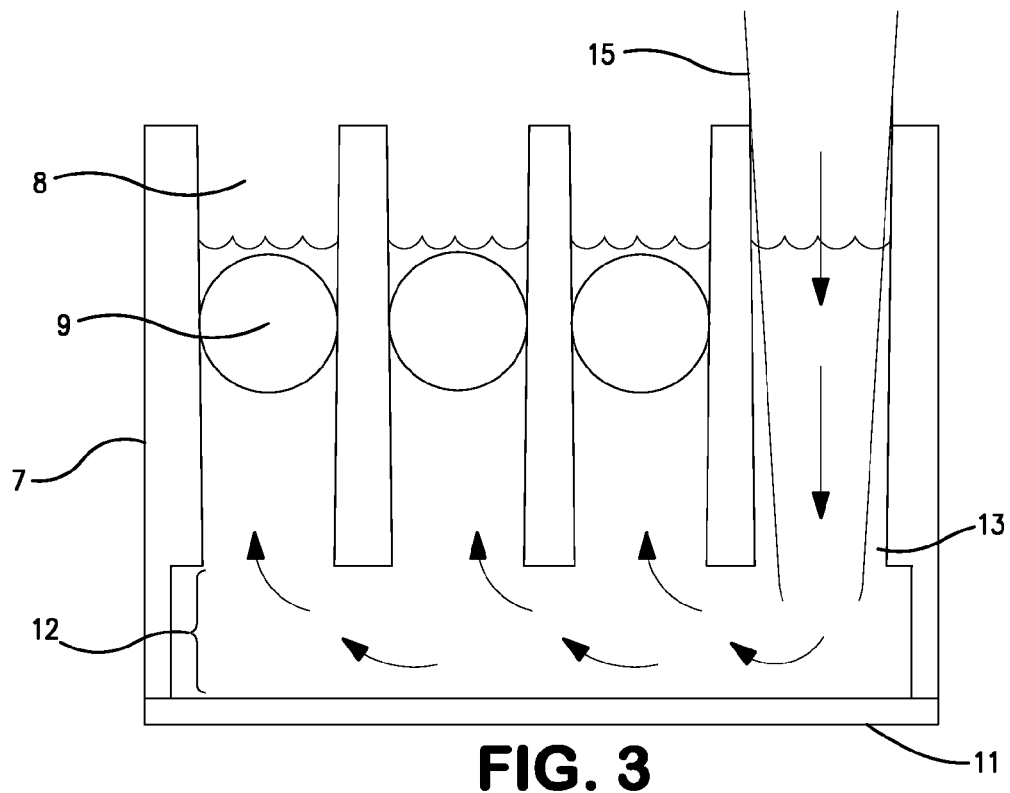
FIG. 3 is a side view of the analysis panel of FIG. 2 additionally showing the positioning of a liquid handling dispenser tip within a fluid port contained in the subwell array.

Each subwell array 20 further comprises a fluid port 13 which accommodates a liquid handling dispensing tip 15, such as that shown in FIG. 3. The liquid handling dispensing tip 15 preferably is able to access the plate bottom 11 at the bottom of the reservoir 12 such that the liquid handing dispensing tip 15 may fill the reservoir 12 and hence each subwell 8 in the subwell array 20 simultaneously, as shown by arrows in FIG. 3. Conversely, the liquid handling dispensing tip 15 may remove liquid from each subwell 8 in the subwell array 20 simultaneously.

Each bead 9 in the subwell array 20 may be individually coated with an analyte such that each subwell 8 in the subwell array 20 may be a separate screen or test. The position of, and analyte bead 9 contained within, each subwell 8 may be positionally indexed to provide further analytic information for the screen or test, for example by optical detection methods which are well known in the art.

EXAMPLE 2

Multiple Analyte Beads Per Subwell

A microtiter plate 10 such as that shown in FIG. 1 is produced such that the walls defining each well 50 have been adapted to form arrays of subwells 8 within each well 7. A subwell array 20 may be adapted such as that shown in FIG. 4 to include a porous separator 6 between the subwells 8 and a reservoir 12. Each subwell 8 contains multiple analyte beads 5 which are kept in each subwell 8 by the porous separator 6. The porous separator 6 allows the reservoir 12 to remain in fluid contact with each subwell 8.

Figure 4:
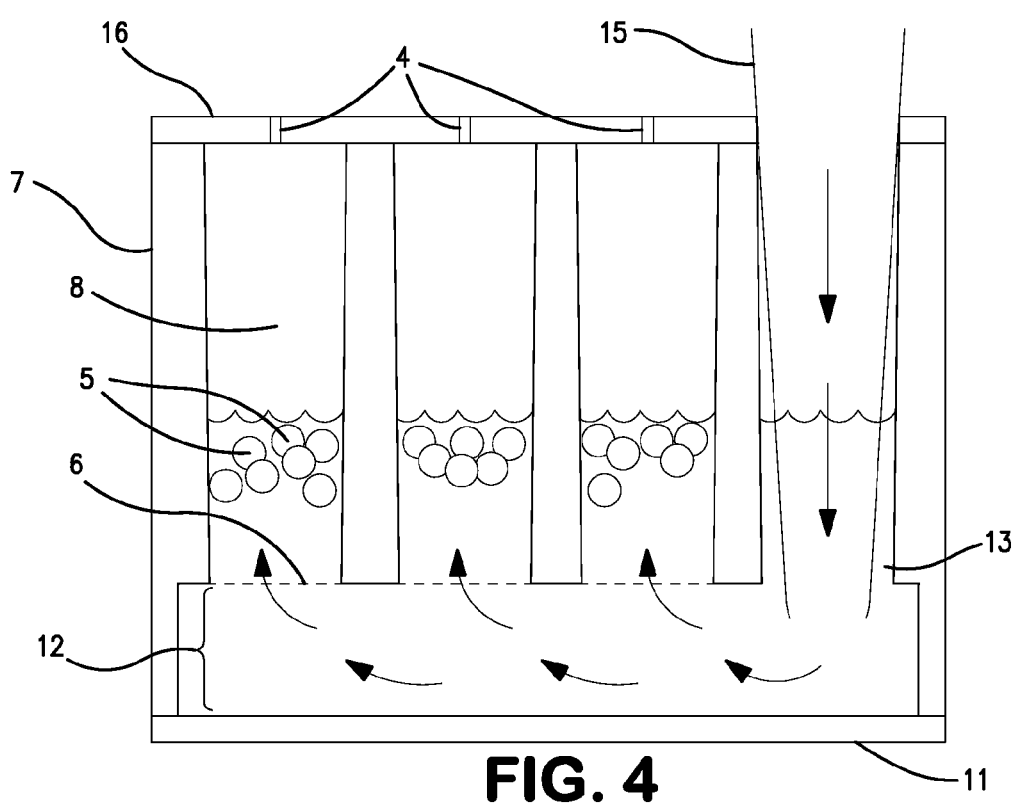
FIG. 4 is an alternate embodiment of the present invention in which each subwell in a main well contains multiple analyte beads. This embodiment of the present invention also comprises a porous separator between the subwell array and reservoir to keep the analyte beads from entering the reservoir below the subwell array. This embodiment of the present invention further comprises a lid for each array of subwells which contains vent holes above each subwell and fluid port for a liquid handling dispenser tip.

Each subwell array 20 further comprises a fluid port 13 which accommodates a liquid handling dispensing tip 15, such as that shown in FIG. 4. The liquid handling dispensing tip 15 preferably is able to access the plate bottom 11 at the bottom of the reservoir 12 such that the liquid handing dispensing tip 15 may fill each subwell 8 in the subwell array 20 simultaneously, as shown by arrows in FIG. 4. Conversely, the liquid handling dispensing tip 15 may remove liquid from each subwell 8 in the subwell array 20 simultaneously.

The beads 5 in the subwell array 20 may be individually coated with an analyte or analyte binding molecule such that each subwell 8 in the subwell array 20 may be used to conduct a separate screen or test. The diameter of the beads 5 is preferably between 0.01 mm and 0.07 mm and the well 7 and subwell 8 dimensions and spacings conform to the SBS standard. The position of, and analyte beads 5 contained within, each subwell 8 may be positionally indexed to allow further analysis of the screen or test, for example by optical detection methods which are well known in the art.

The subwell array 20 also comprises a removable lid 16 which confines the analyte beads 5 to each subwell 8 in the subwell array 20. The lid 16 contains vents 4 above each subwell 8 to allow air flow while adding fluid to, or removing fluid from, each subwell 8. The lid 16 further contains an opening above the fluid port 13 to allow a liquid handling dispenser tip 15 accesses to the reservoir 12 below the subwells 8. The lid 16 further allows each subwell array 20 to be shipped with analyte beads 5 preloaded in each subwell 8 without the need to remove the lid 16 during screening or testing.

Every arrangement or combination of components described or exemplified can be used to practice the invention, unless otherwise stated. Specific names of compounds are intended to be exemplary, as it is known that one of ordinary skill in the art can name the same compounds differently. One of ordinary skill in the art will appreciate that methods, device elements, starting materials, application methods, biomolecules, other molecules and the like other than those specifically exemplified can be employed in the practice of the invention without resort to undue experimentation. All art-known functional equivalents, of any such methods, device elements, starting materials, synthetic methods, and molecules are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art.

One skilled in the art readily appreciates that the present invention is well adapted to carry out the objects and obtain the ends and advantages mentioned, as well as those inherent in the present invention. The methods, components, materials and dimensions described herein as currently representative of preferred embodiments are provided as examples and are not intended to limit the scope of the invention. Changes therein and other uses which are encompassed within the spirit of the invention will occur to those skilled in the art, are included within the scope of the claims.

Although the description herein contains certain specific definitions, information and examples, these should not be construed as limiting the scope of the invention, but rather as merely providing illustrations of some of the embodiments of the invention. Thus, additional embodiments are within the scope of the invention and within the following claims.

What is claimed is:

1. A microtiter plate comprising:
   an array of wells having multiple rows of wells and multiple columns of wells;
   a respective array of subwells, each having multiple rows of subwells and multiple columns of subwells, provided within each of a plurality of the wells of the array of wells;
   a respective reservoir provided beneath each array of subwells within a respective lower end of each well of the array of wells, wherein the reservoir is in direct fluid communication with a respective lower end of each of a plurality of the subwells of the array of subwells within each respective well;

a respective elongated port provided among each of the array of subwells within each of the plurality of wells of the array of wells, each respective elongated port extending between an upper end of each well and each respective reservoir beneath the array of subwells to accommodate a liquid handling dispenser tip and to enable filling of at least a portion of each of the plurality of subwells of the array of subwells within each respective well simultaneously via the respective elongated port;

wherein the cross-sectional area of the top of each subwell is greater than the cross-sectional area of the bottom of each subwell; and wherein one or more subwells each contain a bead positioned within the subwell between the top of the subwell and the bottom of the subwell.

2. The microtiter plate of claim 1 further comprising a lid for the array of subwells.

3. The microtiter plate of claim 2 wherein the lid contains an opening above each subwell and above each elongated port.

4. The microtiter plate of claim 1 wherein the microtiter plate comprises one or more of polystyrene, polypropylene, high-density polypropylene, low-density polypropylene, a cycloalkene or polycarbonate.

5. The microtiter plate of claim 4 wherein the microtiter plate comprises polystyrene.

6. The microtiter plate of claim 1 wherein the bead comprises a material selected from the group consisting of at least one of nylon, polystyrene, stainless steel, glass, agarose, a cellulosic material or ceramic.

7. The microtiter plate of claim 1 wherein the bead is substantially spherical and has a diameter between 0.8 mm and 1.7 mm.

8. The microtiter plate of claim 1 wherein the bead comprises a reagent for measuring an analyte.

9. The microtiter plate of claim 1 in which the bead is positionally indexed within each well.

10. A microtiter plate comprising:
an array of wells having multiple rows of wells and multiple columns of wells;
a respective array of subwells, each having multiple rows of subwells and multiple columns of subwells, provided within each of a plurality of the wells of the array of wells;
a respective reservoir provided beneath each array of subwells within a respective lower end of each well of the array of wells, wherein the reservoir is in direct fluid communication with a respective lower end of each of a plurality of the subwells of the array of subwells within each respective well;
a respective elongated port provided among each of the array of subwells within each of the plurality of wells of the array of wells, each respective elongated port extending between an upper end of each well and each respective reservoir beneath the array of subwells to accommodate a liquid handling dispenser tip and to enable filling of at least a portion of each of the plurality of subwells of the array of subwells within each respective well simultaneously via the respective elongated port; and a respective porous separator positioned between each of the array of subwells and the corresponding reservoir there beneath.

11. The microtiter plate of claim 10 further comprising a lid for the array of wells.

12. The microtiter plate of claim 11 wherein the lid contains openings above each subwell and above each elongated port.

13. The microtiter plate of claim 10 wherein one or more subwells each contains one or more beads.

14. The microtiter plate of claim 13 wherein the bead comprises a material selected from the group consisting of at least one of nylon, polystyrene, stainless steel, glass, agarose, a cellulosic material or ceramic.

15. The microtiter plate of claim 13 wherein the bead is substantially spherical and has a diameter between 0.01 mm and 0.07 mm.

16. The microtiter plate of claim 13 wherein each bead comprises a reagent for measuring an analyte.

17. The microtiter plate of claim 13 wherein the beads are positionally indexed within each well.

18. The microtiter plate of claim 10 wherein the microtiter plate comprises one or more of polystyrene, polypropylene, high-density polypropylene, low-density polypropylene, a cycloalkene or polycarbonate.

19. The microtiter plate of claim 10 wherein the microtiter plate comprises polystyrene.

20. The microtiter plate of claim 10 wherein the cross-sectional area of the top of each subwell is greater than the cross-sectional area of the bottom of each subwell.

21. A microtiter plate comprising:
an array of wells having multiple rows of wells and multiple columns of wells; and
a plurality of subwell array units, each of the plurality of subwell array units positioned in a respective well of the array of wells and each of the plurality of subwell array units including:
a plurality of subwells arranged in an array of multiple rows and multiple columns;
a reservoir provided beneath the plurality of subwells within a lower end of the well in which the subwell array unit is positioned and being in direct fluid communication with a respective lower end of each of the plurality of subwells, wherein each of the plurality of subwell array units further includes a porous separator positioned between the plurality of subwells and the reservoir there beneath; and
an elongated port provided among the plurality of subwells, the elongated port extending between an upper end of the well in which the subwell array unit is positioned and the reservoir provided beneath the plurality of subwells to accommodate a liquid handling dispenser tip and to enable filling of at least a portion of each of the plurality of subwells simultaneously via the elongated port.

22. The microtiter plate of claim 21 wherein, for each of the plurality of subwell array units, the cross-sectional area of the top of each subwell of the plurality of subwells is greater than the cross-sectional area of the bottom of each subwell.

* * * * *

UNITED STATES PATENT AND TRADEMARK OFFICE
CERTIFICATE OF CORRECTION

| | | |
|---|---|---|
| PATENT NO. | : 8,877,141 B2 | Page 1 of 1 |
| APPLICATION NO. | : 12/205605 | |
| DATED | : November 4, 2014 | |
| INVENTOR(S) | : Xiang Yu | |

It is certified that error appears in the above-identified patent and that said Letters Patent is hereby corrected as shown below:

On the title page

Item (56):
Should read --WO  98/29736  07/1998--.

Signed and Sealed this
Twenty-ninth Day of March, 2016

Michelle K. Lee
*Director of the United States Patent and Trademark Office*